US010808566B2

(12) United States Patent
 Nishiyama (10) Patent No.: US 10,808,566 B2
(45) Date of Patent: Oct. 20, 2020

(54) VALVE DEVICE FOR TURBINE, TURBINE, AND METHOD FOR PRODUCING VALVE DEVICE AND TURBINE

(71) Applicant: MITSUBISHI HEAVY INDUSTRIES COMPRESSOR CORPORATION, Tokyo (JP)

(72) Inventor: Kenichi Nishiyama, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 47 days.

(21) Appl. No.: 16/225,568

(22) Filed: Dec. 19, 2018

(65) Prior Publication Data
 US 2019/0234230 A1    Aug. 1, 2019

(30) Foreign Application Priority Data

Jan. 30, 2018  (JP) .................................. 2018-013376

(51) Int. Cl.
 *F01D 17/14*       (2006.01)
 *F01D 17/18*       (2006.01)
 (Continued)

(52) U.S. Cl.
 CPC ......... *F01D 17/145* (2013.01); *F01D 17/105* (2013.01); *F01D 17/18* (2013.01);
 (Continued)

(58) Field of Classification Search
 CPC ...... F01D 17/26; F01D 17/145; F01D 17/105; F01D 17/18; F16K 1/427; F16K 1/44; F05B 2220/301; F05D 2220/31
 (Continued)

(56) References Cited

U.S. PATENT DOCUMENTS 2,147,874 A  *  2/1939  Zetterquist .............. F01D 17/18
                                          415/151
2,192,193 A  *  3/1940  Johnson ............... G05D 23/125
                                          137/630.19
(Continued)

FOREIGN PATENT DOCUMENTS

EP         1813779 A1     8/2007
GB          799580 A   *  8/1958  ............. F01D 17/26
WO       2014/155579 A1   10/2014

OTHER PUBLICATIONS

Extended European Search Report in corresponding European Application No. 18213655.6, dated Jul. 2, 2019 (10 pages).

*Primary Examiner* — Thai Ba Trieu (74) *Attorney, Agent, or Firm* — Osha Liang LLP (57) ABSTRACT

A valve device for installing in a cylinder of a turbine casing includes a plurality of valves arranged within a casing of a pressure receiving steam chamber, a plurality of steam channels fluidly communicating between the plurality of valves and the cylinder of the turbine casing, and a pressure receiving plate configured to receive pressure of steam in the pressure receiving steam chamber to hold at least two valve seats of the plurality of valves on the casing of the pressure receiving steam chamber. The pressure receiving plate has locking holes corresponding to the at least two valve seats, and the at least two valve seats are fully circumferentially locked by inner peripheral edges of the locking holes.

10 Claims, 8 Drawing Sheets

(51) Int. Cl.
 *F01D 17/10* (2006.01)
 *F01D 17/26* (2006.01)
 *F16K 1/44* (2006.01)
 *F16K 1/42* (2006.01)

(52) U.S. Cl.
 CPC .............. *F01D 17/26* (2013.01); *F16K 1/427* (2013.01); *F16K 1/44* (2013.01); *F05B 2220/301* (2013.01); *F05D 2220/31* (2013.01)

(58) Field of Classification Search
 USPC ....... 60/615, 644.1, 653, 646, 657; 415/155, 415/214.1; 317/630.19; 251/333; 137/630.19
 See application file for complete search history.

(56) References Cited

U.S. PATENT DOCUMENTS

| | | | | |
|---|---|---|---|---|
| 2,294,127 | A * | 8/1942 | Pentheny | F01D 17/18 415/201 |
| 2,308,897 | A * | 1/1943 | Stearns | F01D 25/26 415/214.1 |
| 2,385,537 | A * | 9/1945 | Pentheny | F01D 17/18 137/630.19 |
| 2,540,691 | A * | 2/1951 | Reese | F01K 7/24 251/32 |
| 3,322,153 | A * | 5/1967 | Rankin | F01D 1/023 137/630.19 |
| 3,677,658 | A * | 7/1972 | Dinenno, Jr. | F01D 17/18 415/108 |
| 3,763,894 | A * | 10/1973 | Meyer | F01D 17/18 137/630.19 |
| 3,973,402 | A * | 8/1976 | Silvestri, Jr. | F01K 3/265 60/678 |
| 4,235,416 | A * | 11/1980 | LaCoste | F16K 1/482 251/86 |
| 4,320,625 | A * | 3/1982 | Westphal | F01D 19/02 60/646 |
| 4,456,032 | A * | 6/1984 | Straslicka | F01D 17/18 137/630.19 |
| 4,576,008 | A * | 3/1986 | Silvestri, Jr. | F01K 9/04 60/662 |
| 4,850,793 | A * | 7/1989 | Silvestri, Jr. | F01D 17/18 415/38 |
| 6,099,246 | A | 8/2000 | Lochner et al. | |
| 7,028,479 | B2 * | 4/2006 | Gobrecht | F01D 19/02 60/646 |
| 7,568,342 | B2 * | 8/2009 | Cloppenburg | F01K 9/02 60/653 |
| 9,404,382 | B2 * | 8/2016 | Kato | F01K 7/04 |
| 10,227,898 | B2 * | 3/2019 | Kawashima | F01D 17/18 |
| 2016/0010508 | A1 | 1/2016 | Kawashima | |
| 2018/0283177 | A1 * | 10/2018 | Bini | F01K 23/10 |

* cited by examiner

FIG. 1

MAIN STEAM

VALVE DEVICE FOR TURBINE, TURBINE, AND METHOD FOR PRODUCING VALVE DEVICE AND TURBINE

BACKGROUND

Field

The present disclosure relates to a valve device for a turbine, a turbine including the valve device, and a method for producing the valve device and the turbine.

Description of the Related Art

A valve device, for example, a stop valve used for controlling supply of steam into a cylinder of a steam turbine includes a plurality of valves arranged in an elongated chamber into which the steam flows from outside, and a casing in which the chamber and a plurality of steam channels providing communication between the valves and the cylinder are formed.

The plurality of valves each include a valve body, a valve seat that is located at an inlet of the steam channel and receives the valve body, and a valve rod connecting the valve body to a support placed in the chamber (International Publication No. WO 2014/155579).

The valve body of each of the plurality of valves coordinates with an operation of a drive mechanism including the support via the valve rod, and is gradually separated from the valve seat to open the steam channel.

Each valve seat is formed to be narrowed so that the steam channel has a reduced sectional area near the inlet of the channel, and expanded so that the channel has an increasing sectional area downstream of the narrowed position.

The valve seats of the plurality of valves in the valve device are secured to the casing by welding or fastening.

However, depending on a lift amount of the valve body from the valve seat, a load is applied in a direction separating the valve seat from the casing due to a flow of steam flowing between the valve body and the valve seat and flowing inside the valve seat.

An object of the present disclosure is to provide a valve device for a turbine in which valve seats of a plurality of valves can be reliably secured to a casing against a load even applied to the valve seats, a turbine including the valve device, and a method for producing the valve device and the turbine.

SUMMARY

The present disclosure provides a valve device for a turbine including: a plurality of valves arranged in a chamber into which a fluid flows; a casing in which the chamber and channels providing communication between the plurality of valves and a cylinder of the turbine are formed; and a pressure receiving member configured to receive pressure of the fluid in the chamber to hold two or more valve seats of the two or more valves on the casing.

In the valve device for a turbine of the present disclosure, the pressure receiving member preferably receives pressure of the fluid in the chamber on an entire region extending across the two or more valve seats.

In the valve device for a turbine of the present disclosure, it is preferable that the pressure receiving member has locking holes corresponding to the two or more valve seats, and the valve seats are fully circumferentially locked by inner peripheral edges of the locking holes.

In the valve device for a turbine of the present disclosure, each valve seat preferably includes an upstream end protruding from the casing and inserted into the locking hole in the pressure receiving member, and a flange locked by the casing and on which the pressure receiving member is placed.

In the valve device for a turbine of the present disclosure, a seal is preferably provided between the valve seat held by the pressure receiving member and the casing.

In the valve device for a turbine of the present disclosure, the pressure receiving member is preferably fastened to the casing.

In the valve device for a turbine of the present disclosure, an insertion hole in the pressure receiving member into which a fastening member is inserted is preferably sealed.

The present disclosure also provides a valve device for a turbine including: a plurality of valves arranged in a chamber into which a fluid flows; and a casing in which the chamber and channels providing communication between the plurality of valves and a cylinder of the turbine are formed, wherein a pressure receiving portion is integrally formed with valve bodies of the two or more valves, the pressure receiving portion extending across the valve bodies and being configured to receive pressure of the fluid in the chamber.

A turbine of the present disclosure includes the valve device described above.

The present disclosure provides a method for producing a valve device including a plurality of valves arranged in a chamber into which a fluid flows, and a casing in which the chamber and channels providing communication between the plurality of valves and a cylinder of the turbine are formed, wherein the method includes a step of installing a pressure receiving member across valve seats of the two or more valves to hold valve bodies of the two or more valves on the casing.

The method for producing a valve device of the present disclosure preferably includes a step of assembling the valve seats to the pressure receiving member before installing the pressure receiving member.

According to a method for producing a turbine of the present disclosure is characterized in that a turbine including a valve device is obtained by performing the method for producing a valve device described above.

According to the present disclosure, based on surface pressure of the pressure receiving member that receives fluid pressure of the chamber, the valve seats can be reliably held against an excessive load separating the valve seats from the casing. This can prevent damage to the valve seats, the valve bodies, the casing, or the like and ensure reliability. Further, the pressure receiving member reliably holds the valve seats on the casing to provide a sufficient seal between the valve seats and the casing, thereby preventing leakage of a fluid and providing satisfactory performance of the turbine.

DETAILED DESCRIPTION OF THE PREFERRED EMBODIMENT

Now, with reference to the accompanying drawings, an embodiment of the present disclosure will be described.

Figure 1:
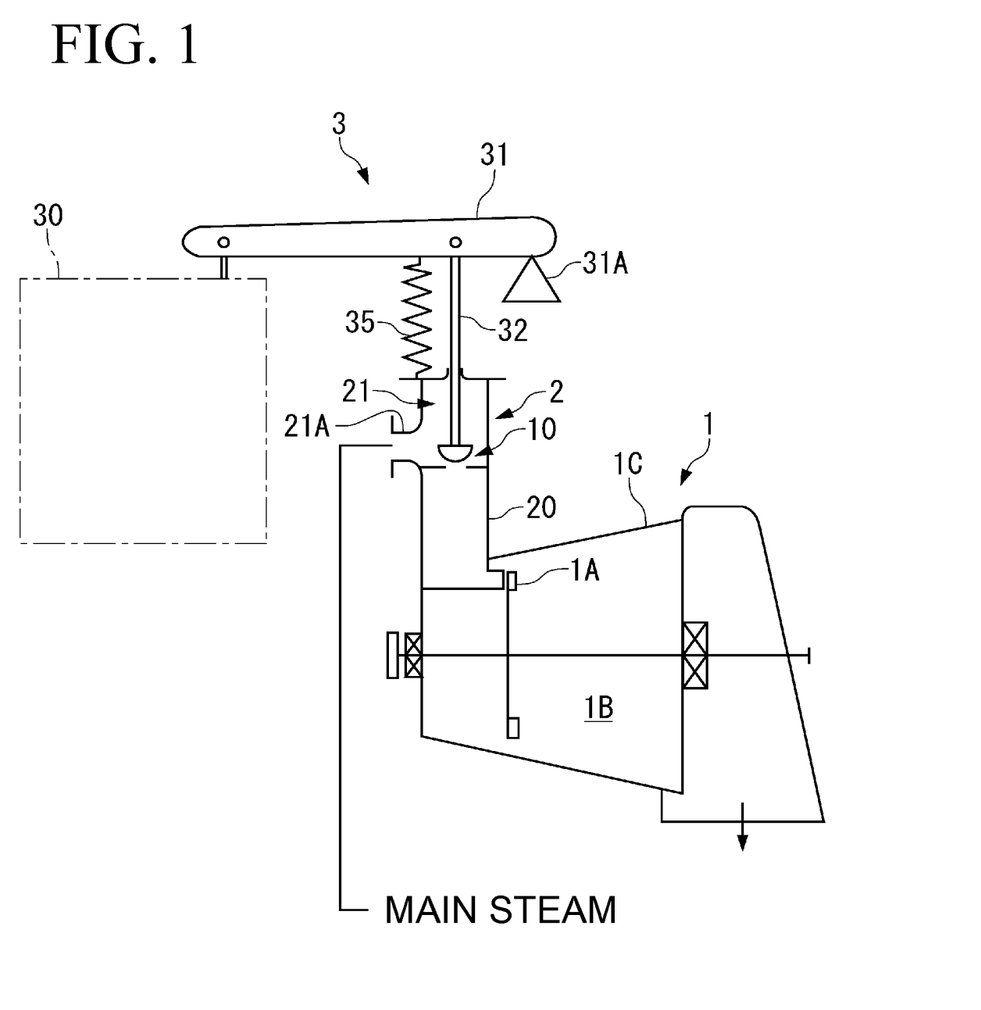
FIG. 1 schematically shows a steam turbine according to an embodiment of the present disclosure.

A steam turbine 1 in FIG. 1 uses steam (fluid) supplied from a boiler (not shown) or the like to rotate blades 1A and thus output power. An electronic control unit (governor) (not shown) of the steam turbine 1 sets appropriate openings of various valves provided in the steam turbine 1 to control an operation of the steam turbine 1. The steam turbine 1 includes a plurality of valves such as a stop valve device 2 to control supply of steam to a cylinder 1B of the steam turbine 1. The stop valve device 2 mainly adjusts a flow rate of steam at startup of the steam turbine 1 and instantaneously blocks the supply in emergency.

Now, a configuration of the multi-valve type stop valve device 2 (FIG. 1 and FIG. 2) provided in the steam turbine 1 will be described. The stop valve device 2 includes a plurality of (five here) valves 10 driven by a valve drive mechanism 3 (FIG. 1) under control by the governor (not shown).

Figure 2:
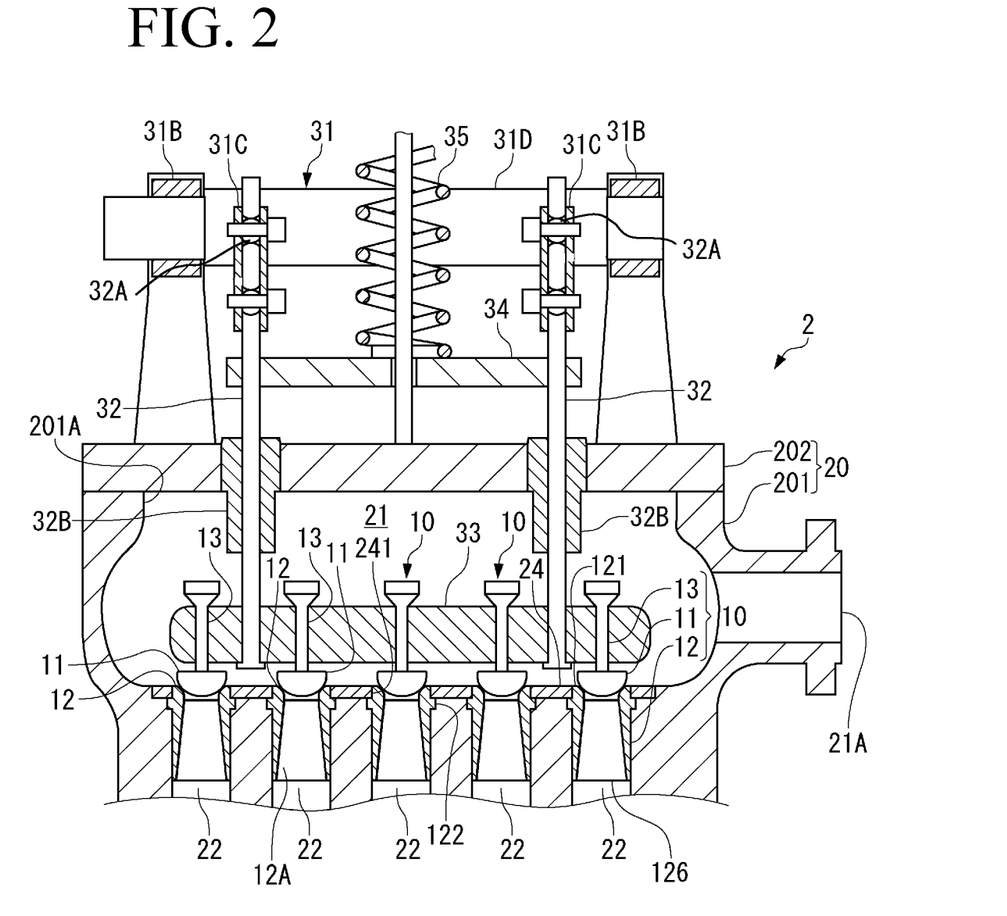
FIG. 2 is a partial cutaway view of a valve device provided in the steam turbine in FIG. 1.

As shown in FIG. 2, the stop valve device 2 (hereinafter referred to as the valve device 2) includes the plurality of valves 10 arranged with a predetermined gap therebetween in a chamber 21 into which steam flows from outside the steam turbine 1, a casing 20 in which the chamber 21 and a plurality of steam channels 22 are formed, and a pressure receiving plate 24 that receives pressure of the steam in the chamber 21.

The configuration of the valve device 2 may be applied also to other valve devices including a plurality of valves such as a regulating valve that adjusts a flow rate of steam supplied to the cylinder 1B or a pressure regulating valve (an air bleed valve or an air mixing valve).

[Configuration of Casing]

The casing 20 of the valve device 2 houses valve bodies 11 of the plurality of valves 10 and a part (support 33) of the valve drive mechanism 3 in the chamber 21.

The casing 20 includes a casing body 201 in which a plurality of steam channels 22 are defined, and a casing lid 202 covering an opening 201A at a top of the casing body 201.

The casing body 201 and the casing lid 202 are both made of an appropriate metal material. The plurality of valves 10 and components of the valve drive mechanism 3 are also made of an appropriate metal material.

The chamber 21 is defined inside the casing body 201 and the casing lid 202.

The casing body 201 is assembled to a casing 1C (FIG. 1) of the steam turbine 1 that defines the cylinder 1B.

The chamber 21 is a continuous long space along a direction of the plurality of valves 10 being arranged. When the steam turbine 1 is operated, steam flows into the chamber 21 from a steam introduction portion 21A formed in the casing 20. The steam having flowed into the chamber 21 is supplied from opening valves 10 out of the plurality of valves 10 through steam channels 22 corresponding to the opening valves 10 to the blades 1A (FIG. 1) in the cylinder 1B.

Each steam channel 22 has an appropriate path extending from a corresponding valve 10 into the cylinder 1B. FIG. 2 shows an upstream side of steam in each steam channel 22 (upper side in FIG. 2) only. A downstream side of each steam channel 22 (lower side in FIG. 2) is not shown.

[Configuration of Valve]

As shown in FIG. 2, the plurality of valves 10 each include a valve body 11, a valve seat 12 that receives the valve body 11, and a valve rod 13 that connects the valve body 11 to the support 33 of the valve drive mechanism 3.

A spherical portion of the valve body 11 provided at a lower end of the valve rod 13 is butted against an upper end of the valve seat 12.

The valve seat 12 is a cylindrical member having an upstream end 121 that forms an inlet of the steam channel 22, and a downstream end 126 located inside the steam channel 22. The valve seat 12 is secured to the casing body 201 by the pressure receiving plate 24 with the side of the downstream end 126 being inserted into the steam channel 22.

The valve seat 12 is formed to be narrowed so that the steam channel has a reduced sectional area near the upstream end 121, and expanded so that the channel has an increasing sectional area downstream of the narrowed position.

The valve body 11 of each of the plurality of valves 10 is coordinated with an operation of the valve drive mechanism 3 including the support 33 via the valve rod 13, and is moved up and down relative to the valve seat 12 according to an opening (lift amount) set by the electronic governor. The valve body 11 of each of the plurality of valves 10 is gradually separated from the valve seat 12 according to the entire flow rate requirement of steam for the valve device 2 to open a corresponding steam channel 22. The valve device 2 allows the flow rate of steam to be adjusted from a minimum flow rate when all of the plurality of valves 10 are fully closed to a maximum flow rate when all of the plurality of valves 10 are fully opened.

[Configuration of Valve Drive Mechanism]

As shown in FIG. 1 and FIG. 2, the valve drive mechanism 3 includes a drive system 30 (FIG. 1) including a hydraulic cylinder and a link mechanism that are operated by control signals from the governor, a lever 31 (FIG. 1) driven by the drive system 30 and swingable around a fulcrum 31A, a support 33 (FIG. 2) connected to the lever 31 by a pair of rods 32, and a spring 35 (FIG. 2) that presses downward a plate 34 provided on the rod 32.

The lever 31 is swingably supported by bearings 31B (FIG. 2). The lever 31 has a pair of lever bodies 31C arranged with a gap therebetween in a length direction of the chamber 21.

Each rod 32 (FIG. 2) is supported by the lever body 31C via a spherical bearing 32A, and inserted into a guide 32B extending through the casing lid 202. The rod 32 is vertically displaced as the lever 31 is swung.

The support 33 (FIG. 2) is suspended from the lever 31 by the pair of rods 32, and horizontally placed in the chamber 21 along the length direction of the chamber 21.

An upper end of the spring 35 is secured to a member (not shown) fixed in position. Since the spring 35 presses the plate 34, each valve body 11 reliably closes the steam channel 22 without any load being applied to the lever 31.

When the drive system 30 causes the lever 31 to swing clockwise in FIG. 1 around a shaft 31D (FIG. 2), the valve body 11 provided on the support 33 is separated from the valve seat 12 as the rod 32 is displaced upward. When the lever 31 swings counterclockwise in FIG. 1, the valve body 11 is moved close to the valve seat 12 as the rod 32 is displaced downward.

[Configuration and Effect of Pressure Receiving Plate]

Next, the pressure receiving plate 24 that secures the valve seats 12 to the casing 20 will be described. This embodiment has a main feature that using pressure of the steam in the chamber 21 during the operation of the steam turbine 1, the pressure receiving plate 24 collectively holds the plurality of valve seats 12 on the casing 20 with a sufficient force against the load applied to the valve seats 12 during the operation. According to this embodiment, there is no need to individually secure the plurality of valve seats 12 to the casing 20 by welding or fastening.

Figure 3A:
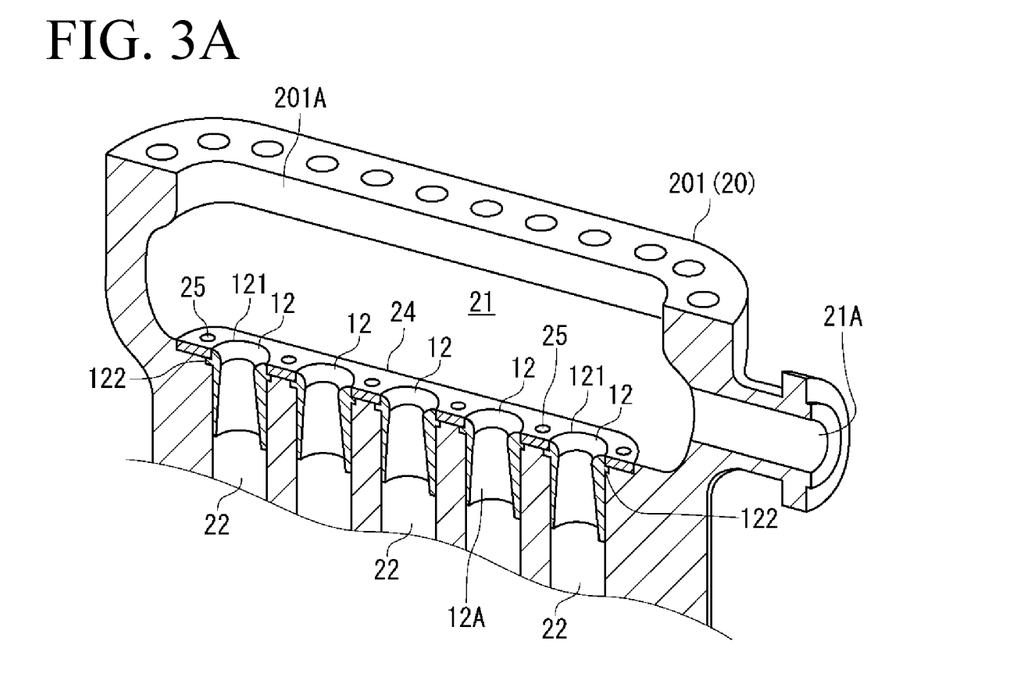
FIG. 3A is a cutaway perspective view of a casing, valve seats, and a pressure receiving plate of the valve device in FIG. 2.

As shown in FIG. 2 and FIG. 3A, the pressure receiving plate 24 extends across a region including positions of the valve seats 12 of the plurality of valves 10. The pressure of the steam in the chamber 21 is preferably applied to the entire region of the pressure receiving plate 24.

The pressure receiving plate 24 receives the pressure of the steam in the chamber 21, and collectively holds the plurality of valve seats 12 located in the region of the pressure receiving plate 24 on the casing body 201.

Since the steam having passed through the narrowed position of each valve seat 12 is increased in pressure with decreasing flow speed, the pressure of the steam downstream of the narrowed position is applied toward the upstream side to apply a force in a direction separating the valve seat 12 from the casing body 201 depending on a lift amount of the valve body 11. Particularly in a state where the valve body 11 is slightly separated from the valve seat 12, there is a significant pressure difference between the narrowed position of the valve seat 12 almost in a vacuum and the downstream side thereof (diffuser portion 12A), and thus an increased load is applied to the valve seat 12.

However, a force that can sufficiently press the valve seat 12 on the casing body 201 against the large load applied to the valve seat 12 due to the flow of the stream in the valve seat 12 is ensured as surface pressure on the pressure receiving plate 24 that receives the pressure of the steam in the chamber 21. Based on the surface pressure, the valve seat 12 can be reliably secured to the casing body 201.

To prevent leakage of the steam from the chamber 21 into a space between the valve seat 12 and the casing body 201, a seal is preferably provided between the valve seat 12 held by the pressure receiving plate 24 and the casing body 201.

Figure 3B:
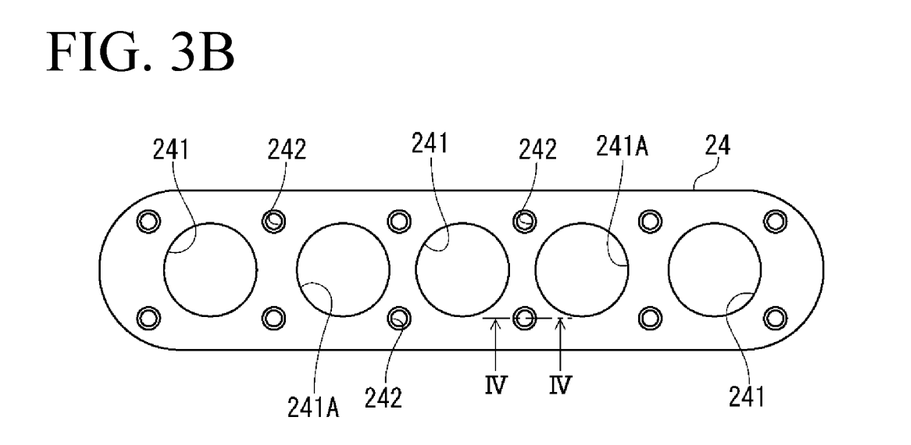
FIG. 3B is a plan view of the pressure receiving plate.

The pressure receiving plate 24 (FIG. 2 and FIG. 3) receives the pressure of the steam in the chamber 21 over the region including the positions of at least two valve seats 12. The pressure receiving plate 24 preferably extends across the entire region in which the valve seats 12 are arranged in the chamber 21 in the length direction so that the pressure receiving plate 24 can hold all the valves 10 on the casing body 201.

The pressure receiving plate 24 in this embodiment extends along the length direction of the casing body 201 across all the valve seats 12 at a bottom of the casing body 201 in which the valve seats 12 are arranged with a predetermined gap therebetween.

As shown in FIG. 3B, the pressure receiving plate 24 is formed of a long plate having a plurality of locking holes 241 individually corresponding to the valve seats 12 extending through the plate in a thickness direction. The pressure receiving plate 24 is formed of an appropriate metal material into a predetermined thickness, and has rigidity required for the excessive load separating the valve seats 12 from the casing body 201.

An inner peripheral edge 241A of the locking hole 241 fully circumferentially locks the valve seat 12. Thus, the valve seat 12 can be fully circumferentially held with an equal force. Further, this is also preferable in terms that a sufficient seal is provided between the valve seat 12 and the casing body 201 fully circumferentially of the valve seat 12.

Seals are also provided between all the valve seats 12 held by the pressure receiving plate 24 and the casing body 201. Thus, there is no need to perform, for each valve seat 12, an individual operation of fully circumferentially welding an outer peripheral portion of the valve seat 12 to the casing body 201 for sealing.

Figure 5:
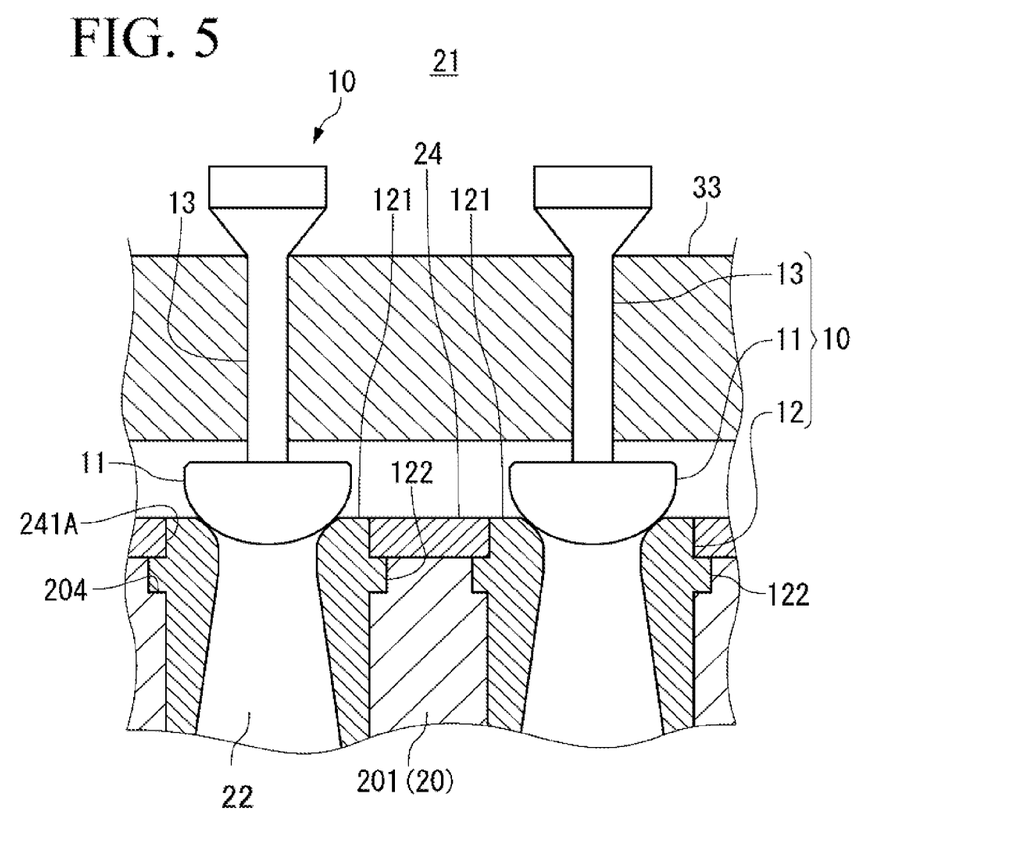
FIG. 5 is a partially enlarged view of FIG. 2.

As shown in FIG. 2 and FIG. 5, the upstream end 121 of the valve seat 12 protruding from the surface of the casing body 201 is inserted into each locking hole 241. The pressure receiving plate 24 is placed on a flange 122 formed in the outer peripheral portion of the valve seat 12. The flange 122 is locked on a step 204 (FIG. 5) formed in the casing body 201.

As shown in FIG. 5, the flange 122 radially protrudes in a position away from the upstream end 121 by the thickness of the pressure receiving plate 24 in the outer peripheral portion of the valve seat 12. Thus, the pressure receiving plate 24 holding the flange 122 is substantially flush with the upstream end 121 of the valve seat 12.

As described above, by the configuration in which the pressure receiving plate 24 holds the flange 122 of the valve seat 12 in a position retracted downward from the upstream end 121 of the valve seat 12, the pressure receiving plate 24 can be placed in the chamber 21 such that interference with the member such as the support 33 located in the chamber 21 can be avoided without an impact of the pressure receiving plate 24 on the flow of the steam in the chamber 21.

Figure 6A:
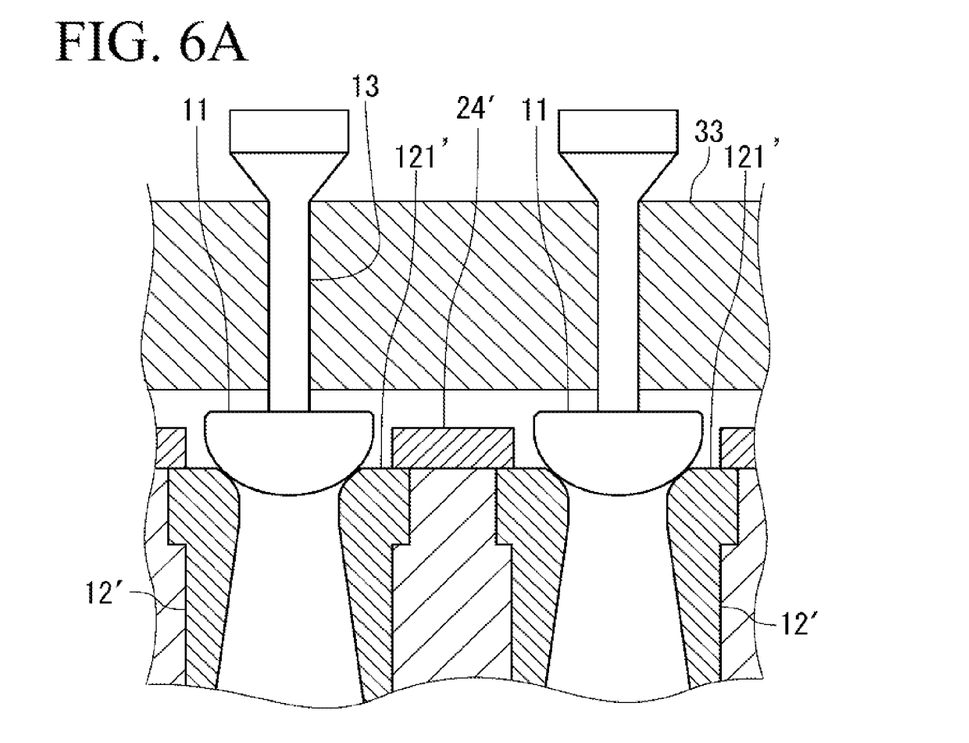
FIG. 6A is a partial cutaway view of a valve device according to a variant of the present disclosure.

The shapes and arrangement of the valve seat 12 and the pressure receiving plate 24 are not limited to those in this embodiment, but as shown in FIG. 6A, a pressure receiving plate 24' may hold an upstream end 121' of a valve seat 12'. In that case, to avoid interference between the valve body 11 and the pressure receiving plate 24', the pressure receiving plate 24' is preferably placed outside a projection region of the valve body 11 onto the valve seat 12.

The pressure receiving plate 24 is fastened to the casing body 201 by fastening members 25 (FIG. 3B and FIG. 4) inserted into a plurality of insertion holes 242. The pressure receiving plate 24 is generally formed to be flat, but may have a dent around each insertion hole 242 (FIG. 3B) in the pressure receiving plate 24 for safe fastening.

Figure 4:
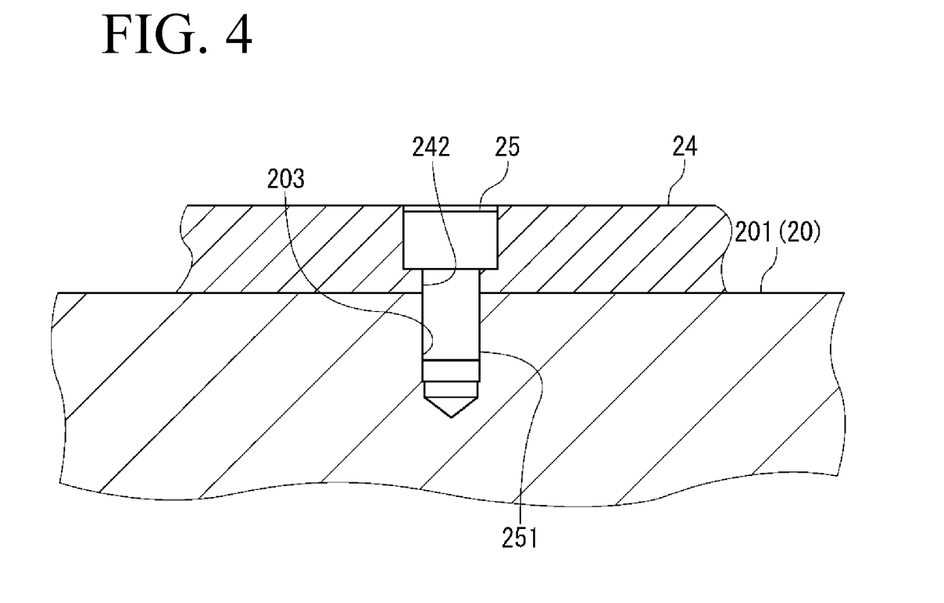
FIG. 4 is a sectional view taken along the line IV-IV in FIG. 3B.

The pressure receiving plate 24 is removably secured to the casing 20 by the fastening members 25. Thus, unlike a case where the plurality of valve seats 12 are individually welded to the casing 20, the pressure receiving plate 24 may be easily removed from the casing 20 and repaired or replaced by another pressure receiving plate 24.

As shown in FIG. 4, the fastening member 25 of this embodiment is a bolt that engages a female thread 203 on the casing body 201.

A shank 251 of the fastening member 25 is inserted into the insertion hole 242 in the pressure receiving plate 24, and the fastening member 25 is secured to the casing 20. Then, the pressure receiving plate 24 is fastened to the casing 20.

[Method for Producing Valve Device]

The valve device 2 described above can be produced by a step of installing the pressure receiving plate 24 in the casing body 201 so as to collectively hold the plurality of valve seats 12 on the casing body 201. An example of a procedure will be described below.

In the step of installing the pressure receiving plate 24, the pressure receiving plate 24 is lowered from above toward the plurality of valve seats 12 arranged in the casing body 201, and placed on the flanges 122 of the valve seats 12. At this time, the upstream ends 121 of the valve seats 12 are inserted into the locking holes 241, and thus the pressure receiving plate 24 is positioned relative to the casing body 201 and the valve seats 12.

Then, the fastening members 25 engage the female threads 203 previously machined in the casing body 201 to fasten the pressure receiving plate 24 to the casing body 201. The female threads 203 may be machined before or after the valve seats 12 are incorporated into the casing body 201 unlike a case where co-machining is required when the individual valve seats 12 are fastened to the casing body 201.

The pressure receiving plate 24 is fastened to the casing body 201, and further the support 33 on which the valve bodies 11 are provided, the casing lid 202, the rod 32, or the like are assembled. In this way, the valve device 2 including the pressure receiving plate 24 can be obtained. Then, the steam turbine 1 including the valve device 2 obtained by the above procedure can be produced.

The pressure receiving plate 24 may be applied to an existing valve device 2, not limited to a newly produced valve device 2. If the forming process of the flange 122 in the valve seat 12 is omitted for the existing valve device 2, the pressure receiving plate 24' may be placed on the upper end of the valve seat 12', as shown in FIG. 6A.

Advantage of this Embodiment

According to this embodiment, the pressure receiving plate 24 that receives the pressure of the steam in the chamber 21 on the region extending across the plurality of valve seats 12 and collectively holds the valve seats 12 can reliably secure the valve seats 12 to the casing 20 (casing body 201) and provide a sufficient seal between the valve seats 12 and the casing 20.

Figure 7A:
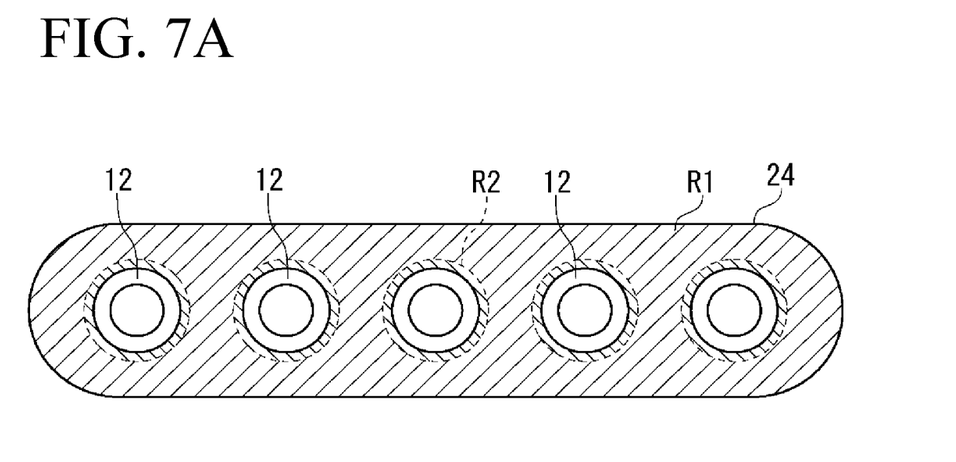
FIG. 7A is a schematic plan view of a pressure receiving region of the pressure receiving plate.

FIG. 7A shows, by a diagonal line pattern, a pressure receiving region R1 of the pressure receiving plate 24 to which the pressure of the steam in the chamber 21 is applied. FIG. 7A also shows, by another diagonal line pattern, regions R2 of the pressure receiving plate 24 to which the load is applied from below, the load being applied to the valve seats 12 in the direction separating the valve seats 12 from the casing 20.

Even if the excessive load is applied to the regions R2 due to the flow of the steam in the valve seats 12, surface pressure applied to the pressure receiving region R1 having a much larger area than the regions R2 allows the pressure receiving plate 24 to obtain a sufficient force to hold the valve seats 12 on the casing 20 against the load separating the valve seats 12 from the casing 20.

Figure 7B:
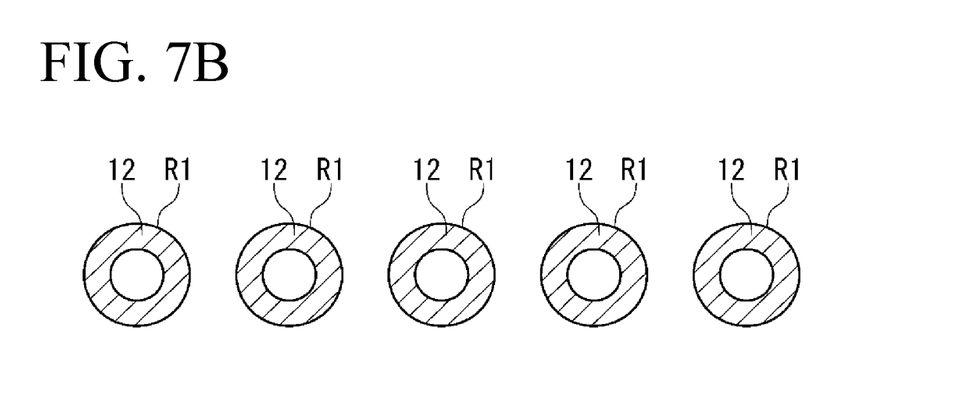
FIG. 7B is a schematic plan view of a comparative example.

On the other hand, FIG. 7B shows a comparative example including no pressure receiving plate 24 for comparison with this embodiment. In this case, without the pressure receiving plate 24, only the regions of the valve seats 12 correspond to the pressure receiving regions R1 that receive the pressure of the steam in the chamber 21 and are held by the casing 20. Of course, the area of the pressure receiving regions R1 in FIG. 7B is smaller than the area of the pressure receiving region R1 of the pressure receiving plate 24 in FIG. 7A.

The load separating the valve seats 12 from the casing 20 due to the flow of the steam in the valve seats 12 is sometimes larger than the force obtained from the pressure of the steam in the chamber 21 by the regions R1 of the valve seats 12 themselves. In the comparative example, to bear this load, the valve seats 12 need to be firmly secured to the casing 20 by welding, fastening or the like.

According to this embodiment including the pressure receiving plate 24, the valve seats 12 can be reliably held against the excessive load separating the valve seats 12 from the casing 20 based on the surface pressure on the pressure receiving plate 24 that receives the pressure of the steam in the chamber 21.

Even if a load received from the pressure in the chamber 21 by the pressure receiving plate 24 is compared with a rising load that can be applied to the valve seat 12 when the valve 10 is opened (a load calculated from the pressure in the chamber 21 and the sectional area of the channel in the narrowed position of the valve seat 12 by experiment), an area of the pressure receiving plate 24, satisfying that the load from the pressure in the chamber 21 is greater than the rising load that can be applied to the valve seat 12, may be, for example, eight times the sectional area of the channel in the narrowed position of the valve seat 12. Thus, indeed, the pressure receiving plate 24 provided across the plurality of valves 10 sufficiently satisfies an area condition for preventing rising of the valve seat 12.

From the above, damage to the valve seats 12, the valve bodies 11, the casing 20, or the like can be prevented to ensure reliability of the valve device 2 and further the steam turbine 1. The pressure receiving plate 24 reliably holds the valve seats 12 on the casing 20 to provide a sufficient seal between the valve seats 12 and the casing 20, thereby preventing leakage of the steam and providing satisfactory performance of the steam turbine 1.

In this embodiment, since the pressure receiving plate 24 reliably secures the valve seats 12, welding or fastening of the valve seats 12 to the casing 20 is not always necessary. Also, the pressure receiving plate 24 in this embodiment can collectively secure the plurality of valve seats 12 to the casing 20 without the individual valve seats 12 being secured to the casing 20 by welding or fastening.

Figure 8A:
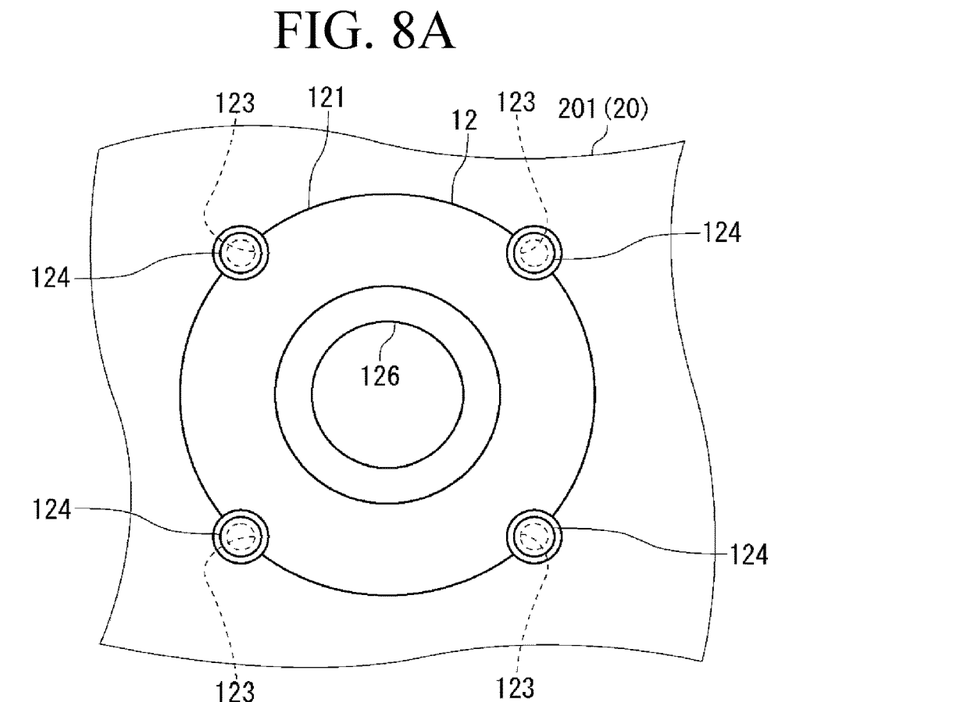
FIG. 8A is a plan view of a valve body fastened to the casing.

If the valve seats 12 are fastened to the casing 20, as shown in FIG. 8A, an operation of co-machining a plurality of female threads 123 extending over each valve seat 12 and the casing 20 around the valve seat 12 and securing the valve seat 12 to the casing 20 with bolts 124 inserted into the female threads 123 needs to be performed for each of the valve seats 12. Stable fastening by the co-machined female threads 123 is difficult.

Figure 8B:
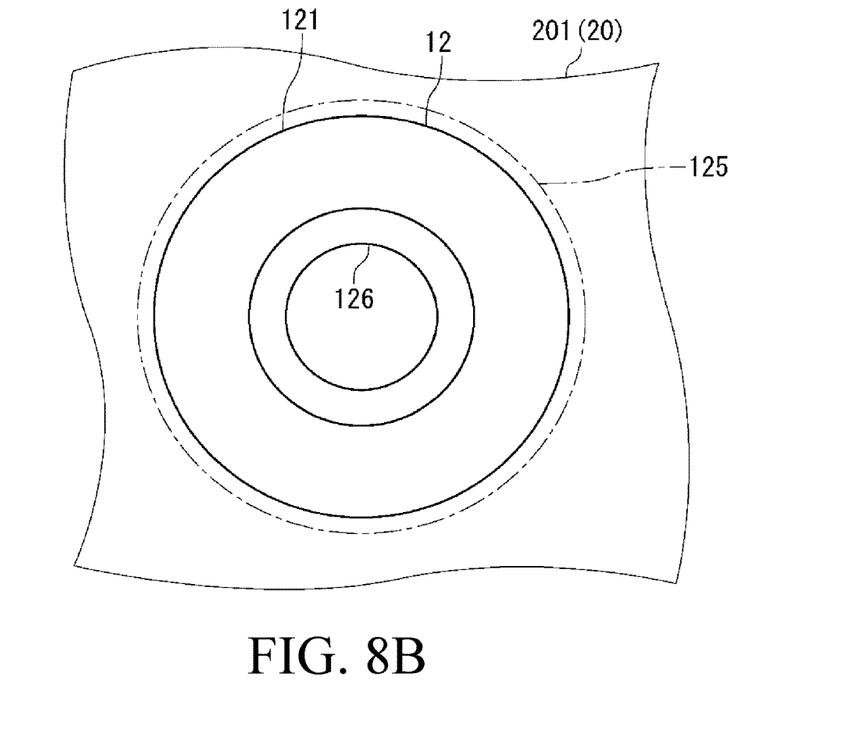
FIG. 8B is a plan view of a valve body welded to the casing.

As shown in FIG. 8B, if the valve seat 12 is welded to the casing 20 around a peripheral edge of the valve seat 12, welding quality needs to be controlled, and weldable materials are limited. Reference numeral 125 in FIG. 8B shows a welded part.

According to this embodiment, the pressure receiving plate 24 generally collectively holds the plurality of valve seats 12 on the casing 20 with a sufficient force. Thus, the plurality of valve seats 12 can be easily reliably secured to the casing 20 using a bolt or the like in a short time based on a pressure receiving area sufficient for a load without any effort in securing the individual valve seats 12 to the casing 20 by welding or fastening or without any limit on materials of the members.

[Variant of Production Method]

To efficiently produce the valve device 2, a step of assembling the plurality of valve seats 12 to the pressure receiving plate 24 may be performed before installing the pressure receiving plate 24. In that case, for example, the flange 122 of the valve seat 12 and the pressure receiving plate 24 are assembled by a bolt or the like with a position (phase) around an axis of each valve seat 12 being adjusted to the steam channel 22 (FIG. 2) in the casing body 201. At this time, a seal may be provided between the outer peripheral portion of the valve seat 12 and the pressure receiving plate 24 therearound by welding if required.

Then, an assembly of the plurality of valve seats 12 and the pressure receiving plate 24 is lowered toward the casing body 201, and thus the valve seats 12 are inserted into the steam channels 22, and the pressure receiving plate 24 is installed in the casing body 201.

As described above, the operation of assembling the plurality of valve seats 12 to the pressure receiving plate 24 before installing the pressure receiving plate 24 may be reliably performed in a place where the operation can be easily performed including a place away from the cylinder 1B of the steam turbine 1 or the casing body 201 of the valve device 2.

[Variant of the Present Disclosure]

Figure 6B:
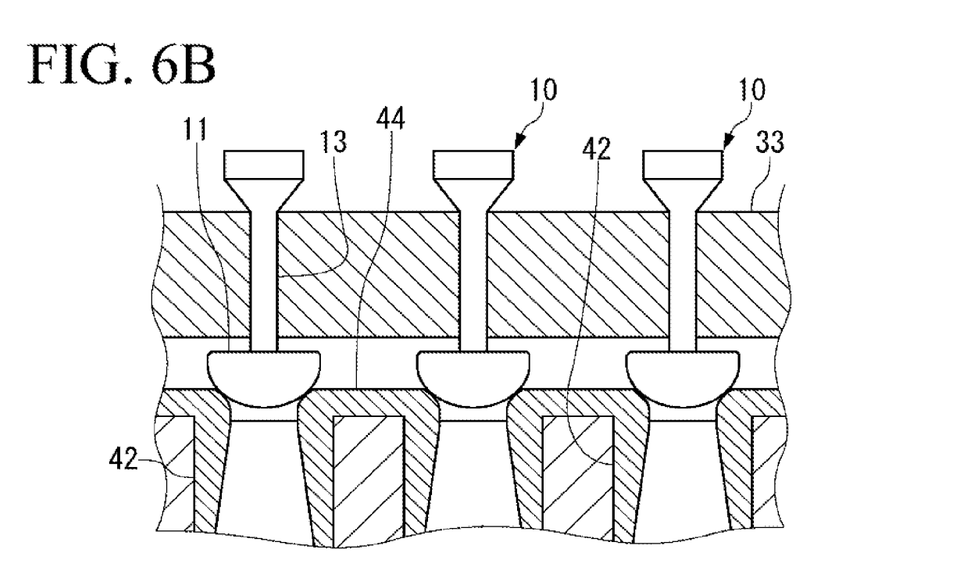
FIG. 6B is a partial cutaway view of a valve device according to another variant.

FIG. 6B shows a valve device 4 according to a variant of the present disclosure. In this variant, a pressure receiving portion 44 that receives pressure of steam in a chamber 21 is integrally formed with two or more valve seats 42, for example, by cutting.

The pressure receiving portion 44 extends across the valve seats 42 of two or more valves 10. The pressure receiving portion 44 and the two or more valve seats 42 generally receive the pressure of the steam in the chamber 21. The pressure receiving portion 44 is integrated with the valve seats 42 to increase a pressure receiving area.

Thus, also according to this variant, the valve seats 42 to which a load separating the valve seats 42 from a casing 20 can be reliably secured to the casing 20, and a sufficient force can be obtained to provide a seal between the valve seats 42 and the casing 20.

Other than the above, the configurations in the embodiments may be chosen or changed to other configurations without departing from the gist of the present disclosure.

The valve device according to the present disclosure may be applied to other turbines (for example, a gas turbine) as long as they include a plurality of valves arranged in a chamber into which a fluid flows, and a pressure receiving member (or a pressure receiving portion) that receives pressure of the fluid in the chamber to hold the two or more valve seats on a casing.

In view of portability or other properties of the pressure receiving plate 24, the pressure receiving plate 24 may be divided, for example, in the length direction. In that case, the divided parts of the pressure receiving plate 24 may be joined to fill a gap therebetween, or the divided parts may be installed in the chamber 21 in a separated manner if the divided parts each have a required pressure receiving area.

In the present disclosure, individually welding or fastening the plurality of valve seats 12 is not excluded. For example, as shown in FIG. 8A, each valve seat 12 may be positioned in the casing 20 by fastening, and then the pressure receiving plate 24 may be installed in the casing 20.

REFERENCE SIGNS LIST 1 steam turbine (turbine)
1A blade
1B cylinder
1C casing
2 stop valve device (valve device)
3 valve drive mechanism
4 valve device
10 valve
11 valve body
12 valve seat
12A diffuser portion
13 valve rod
20 casing
21 chamber
21A introduction portion
22 steam channel (channel)
24 pressure receiving plate (pressure receiving member)
25 fastening member
30 drive system
31 lever
31A fulcrum
31B bearing
31C lever body
31D shaft
32 rod
32A spherical bearing
32B guide
33 support
34 plate
35 spring
42 valve seat
44 pressure receiving portion
121 upstream end
122 flange
123 female thread
124 bolt
125 welded part
126 downstream end
201 casing body
201A opening
202 casing lid
203 female thread
204 step
241 locking hole
241A inner peripheral edge
242 insertion hole
251 shank
R1 pressure receiving region
R2 load region

What is claimed is:

1. A valve device for installing in a cylinder of a turbine casing comprising:
   a plurality of valves arranged within a casing of a pressure receiving steam chamber;
   a plurality of steam channels fluidly communicating between the plurality of valves and the cylinder of the turbine casing; and
   a pressure receiving plate configured to receive pressure of steam in the pressure receiving steam chamber to hold at least two valve seats of the plurality of valves on the casing of the pressure receiving steam chamber,
   wherein the pressure receiving plate has locking holes corresponding to the at least two valve seats, and
   the at least two valve seats are fully circumferentially locked by inner peripheral edges of the locking holes.

2. The valve device according to claim 1, wherein the pressure receiving plate receives pressure of the fluid in the chamber on an entire region extending across the at least two valve seats of the plurality of valves.

3. The valve device according to claim 1, wherein each of the at least two valve seats further includes:
- an upstream end protruding from the casing of the pressure receiving steam chamber and inserted into the locking hole in the pressure receiving plate; and
- a flange locked by the casing of the pressure receiving steam chamber, on which the pressure receiving plate is placed.

4. The valve device according to claim 1, wherein a seal is provided between the at least two valve seats held by the pressure receiving plate and the casing of the pressure receiving steam chamber.

5. The valve device according to claim 1, wherein the pressure receiving plate is fastened to the casing of the pressure receiving steam chamber.

6. The valve device according to claim 5, wherein an insertion hole in the pressure receiving plate into which a fastening member is inserted is sealed.

7. A turbine including a valve device being installed in a cylinder of a turbine casing comprising:
- a plurality of valves arranged within a casing of a pressure receiving steam chamber;
- a plurality of steam channels fluidly communicating between the plurality of valves and the cylinder of the turbine casing; and
- a pressure receiving plate configured to receive pressure of steam in the pressure receiving steam chamber to hold at least two valves seats of the plurality of the valves on the casing of the pressure receiving steam chamber,
- wherein the pressure receiving plate has locking holes corresponding to the at least two valve seats, and
- the at least two valve seats are fully circumferentially locked by inner peripheral edges of the locking holes.

8. A method for installing a valve device in a cylinder of a turbine casing including:
- arranging a plurality of valves within a casing of a pressure receiving steam chamber;
- providing a plurality of steam channels fluidly communicating between the plurality of valves and the cylinder of the turbine casing; and
- installing a pressure receiving plate across at least two valve seats of the plurality of valves to hold the at least two valve seats of the plurality of valves on the casing of the pressure receiving steam chamber,
- wherein the pressure receiving plate has locking holes corresponding to the at least two valve seats, and
- the at least two valve seats are fully circumferentially locked by inner peripheral edges of the locking holes.

9. The method for producing a valve device according to claim 8, further comprising:
- assembling the at least two valve seats to the pressure receiving plate before installing the pressure receiving plate on the casing of the pressure receiving steam chamber.

10. A method for producing a turbine in combination with a valve device comprising:
- arranging a plurality of valves of the valve device within a casing of a pressure receiving steam chamber;
- providing a plurality of steam channels fluidly communicating between the plurality of valves and a cylinder of the turbine casing; and
- installing a pressure receiving plate across at least two valve seats of the plurality of valves to hold the at least two valve seats of the plurality of valves on the casing of the pressure receiving steam chamber,
- wherein the pressure receiving plate has locking holes corresponding to the at least two valve seats, and
- the at least two valve seats are fully circumferentially locked by inner peripheral edges of the locking holes.

* * * * *